June 23, 1970 R. L. GHEEN ET AL 3,516,609
DRAGLINE SPRINKLER SYSTEM
Filed March 1, 1968 2 Sheets-Sheet 1
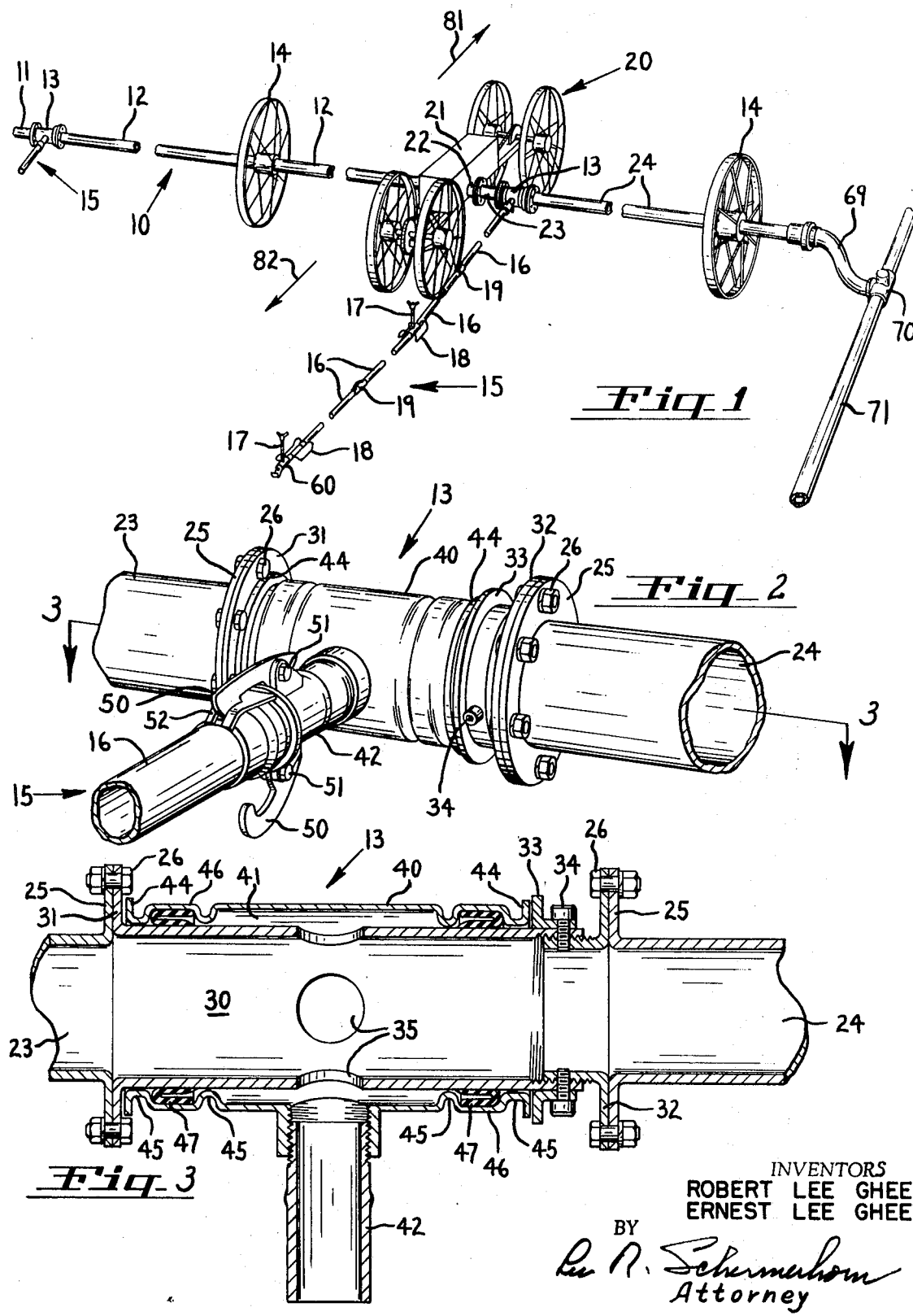
INVENTORS
ROBERT LEE GHEEN
ERNEST LEE GHEEN
BY *Lee R. Schermerhorn*
Attorney

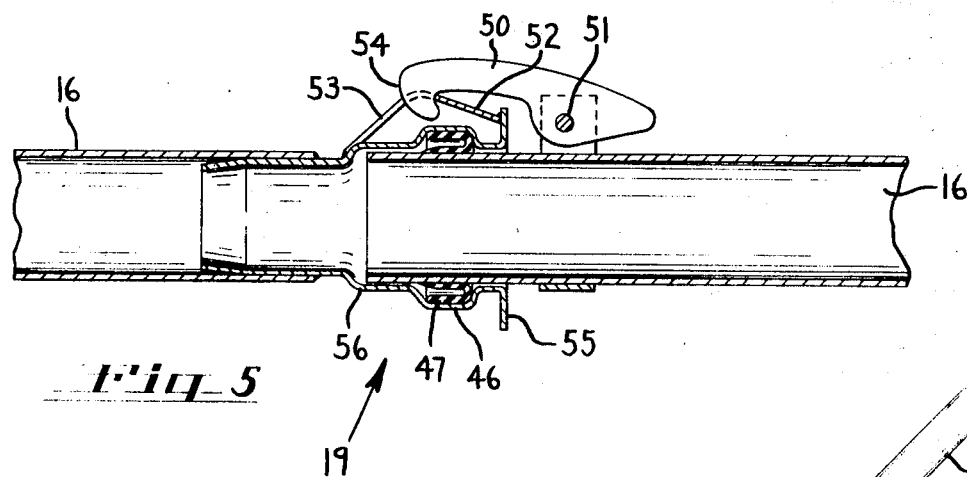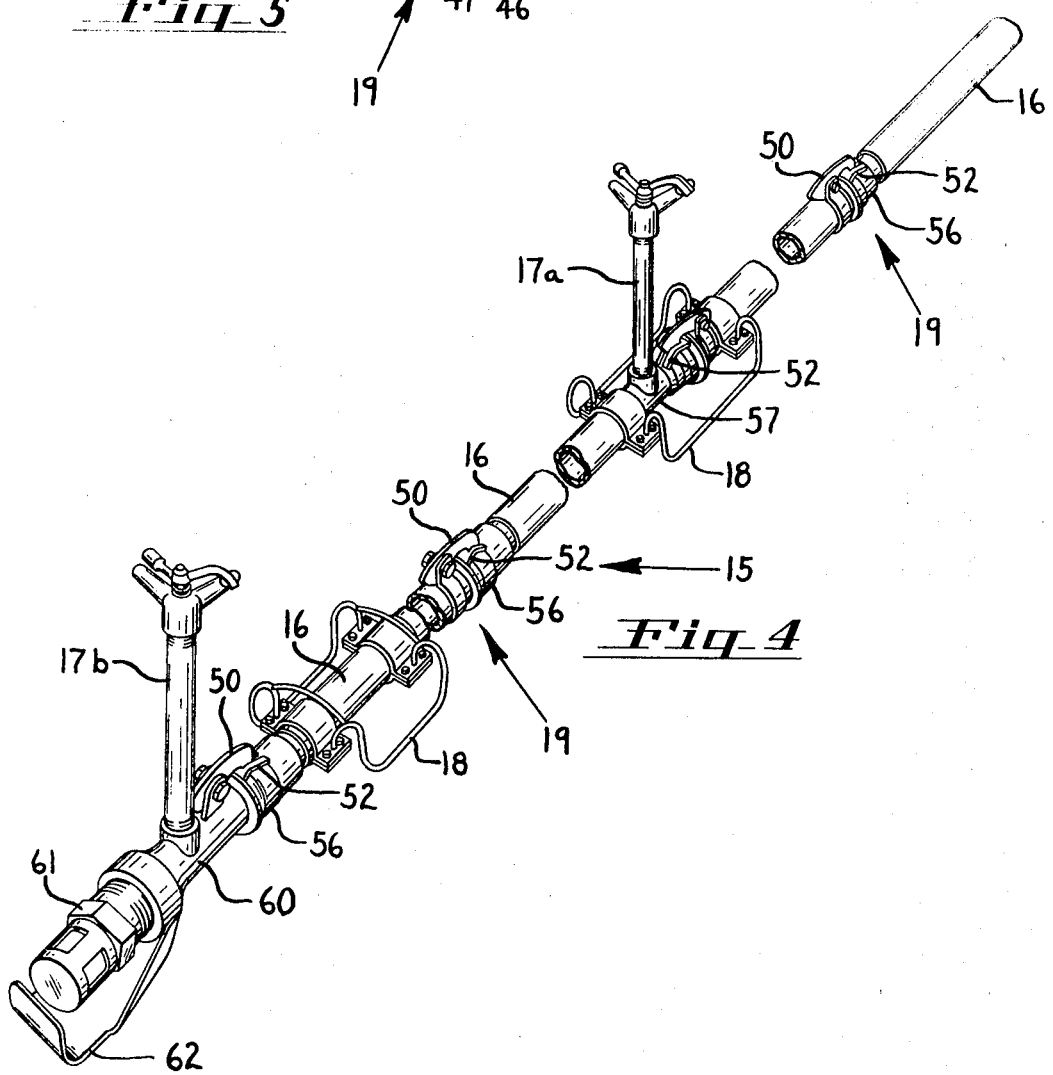

United States Patent Office 3,516,609
Patented June 23, 1970

1

3,516,609
DRAGLINE SPRINKLER SYSTEM
Robert Lee Gheen and Ernest Lee Gheen, both of 500 Willagillespie Road, Eugene, Oreg. 97401
Filed Mar. 1, 1968, Ser. No. 709,747
Int. Cl. A01g 25/02
U.S. Cl. 239—212                                    7 Claims

ABSTRACT OF THE DISCLOSURE

Large wheels are fixedly mounted at intervals on a pipe line to support the pipe in elevated position above a field crop. This wheel line is rotated by a power mover to drive the wheels. At each joint in the wheel line a special rotating coupler is provided to connect a dragline equipped with sprinklers.

Background of the invention

This invention relates to a dragline sprinkler system wherein sprinkler-equipped draglines are connected to a rotating pipe line mounted on wheels to shift the draglines from one sprinkling position to another across a field.

Various arrangements have heretofore been proposed for sprinkling crops in large fields. Known devices for this purpose, however, have been complicated and expensive to manufacture and have required an excessive amount of labor to operate the mechanism in moving it back and forth across a field. There is a need for a sprinkler-type irrigation system of greater simplicity, lower cost and requiring fewer workers to operate. There is also a need for a sprinkler system which will water a larger area than has heretofore been possible.

Previous dragline systems have used rubber hose for the draglines, which wears out rapidly from abrasion and is not strong enough in tension to permit very long draglines. Flexible draglines were necessary in the previous systems in order to turn them around for reverse travel across the field. This had to be done laboriously by hand, making long wheel lines with many draglines impractical.

Summary of the invention

In the present system, large wheels are fixedly mounted at intervals on a pipe line to support the pipe in elevated position above a field crop to be watered. This wheel line is rotated by a power mover to drive the wheels whereby the wheel line is moved across the field. At each joint in the pipe line a special rotating coupler is provided to connect a dragline equipped with sprinklers. The draglines are also made up of pipe sections.

With this system large fields may be watered very efficiently. The rotating wheel line may extend for a quarter of a mile or more. A pipe line of such length pulls behind it a large number of draglines, each equipped with sprinklers at intervals therealong whereby an enormous area may be watered at one setting of the draglines. When such area has been watered, the power mover rotates the wheel line to advance the draglines to a new area. Upon reaching the end of the field, the leading ends of the draglines are disconnected from the wheel line and the latter is shifted to the trailing ends of the draglines. The trailing ends are then connected to the wheel line and the field is traversed in reverse direction without the necessity for manually moving the draglines.

Objects of the invention are to provide an improved dragline sprinkler system, to provide an improved method of operating a dragline sprinkler system, to provide a dragline sprinkler system in which it is convenient to reverse the direction of travel, to provide a dragline system for watering larger areas, to provide draglines made of pipe, and to provide an improved dragline coupler.

2

The invention will be better understood and additional objects and advantages will become apparent from the following description of the preferred embodiment illustrated in the accompanying drawings. Various changes may be made, however, in the details of construction and arrangement of parts and certain features may be used without others. All such modifications are included in the invention.

Brief description of the drawings

FIG. 1 is a fragmentary perspective view, with parts broken away, showing a dragline sprinkler system embodying the principles of the invention;

FIG. 2 is an enlarged fragmentary perspective view showing one of the dragline couplers in FIG. 1;

FIG. 3 is an enlarged view on the line 3—3 in FIG. 2;

FIG. 4 is an enlarged perspective view, with parts broken away, showing one of the draglines; and FIG. 5 is a longitudinal sectional view of a coupler in a dragline.

Description of the preferred embodiment

In FIG. 1, a wheel line 10 comprises a series of pipe sections such as 11 and 12 connected together end to end by means of dragline couplers 13. Each pipe section passes through the hub of a wheel 14 of sufficient radius to support the pipe in elevated position above a crop to be sprinkled. Each wheel is fixedly connected to its pipe section so that rotation of the pipe will drive the wheels.

A dragline 15 is connected to each coupler 13. Each dragline comprises a plurality of pipe sections 16 connected together by couplers 19 and equipped at intervals with sprinklers 17. Associated with each sprinkler 17 is a sled 18 allowing the dragline to slide freely on the ground and additional sleds may be provided between the sprinklers, if desired.

At some point in the wheel line, the wheel line is rotated by a reversible power mover 20. The power mover is a four wheeled vehicle having an internal combustion engine 21. Engine 21 drives the four wheels of the vehicle and also rotates a hollow tubular coupling 22. Coupling 22 extends transversely of the vehicle, one end being connected with pipe section 12 and its opposite end being connected to a short pipe section 23. Numeral 24 indicates one or more additional pipe sections in the wheel line 10. The couplers 13 and 22 are preferably connected with the pipe sections by means of bolted end flanges so that the rotation imparted by driving coupler 22 will be transmitted to all the wheels 14 along the wheel line.

One power mover 20 will operate a wheel line one-fourth mile long. For longer wheel lines, additional power movers may be connected into the line. The pipe sections 11, 12 and 24 are preferably about forty feet long and wheels 14 are about forty feet apart. The draglines 15 are forty feet apart and, in a typical installation, are one hundred twenty feet long.

FIGS. 2 and 3 show the details of construction of the dragline couplers 13. Pipe sections 23 and 24 have end flanges 25 provided with holes to receive bolts 26. A tubular member 30 in the coupling has a flange 31 on one end which is also provided with holes for the bolts 26 whereby the flange 31 is bolted to flange 25 of pipe section 23. The opposite end of member 30 is internally threaded for screw connection with a flange member 32 which is bolted to the flange 25 of pipe section 24. This end of the tubular member is also equipped with a collar 33 secured by screws 34 which engage the flange member 32 to transmit torque through the coupling from pipe section 23 to the pipe section 24.

Tubular member 30 is provided with a plurality of openings 35. Surrounding the openings 35 is a rotatable sleeve 40 of larger diameter than the tubular member 30 to provide an annular chamber 41 therebetween. Sleeve 40 is equipped with a radial nipple 42 for connection to a dragline 15. Water supplied to wheel line 10 flows through openings 35, chamber 41 and nipple 42 to the dragline 15.

The ends of sleeve 40 are flanged at 44 to rotate with running clearance between end flange 31 and collar 33 on the member 30. Between the flanges 44 and annular chamber 41, the sleeve is necked at 45 to form a pair of annular seal chambers 46. Each of these chambers contains a rotating-type rubber seal ring 47. Couplers 13 provide rotative mechanical and hydraulic connections between wheel line 10 and draglines 15.

The construction of couplers 19 is shown in FIG. 5. A gravity actuated hook 50 is pivotally mounted at 51 on one end of one pipe section 16 on the upper side thereof. The other pipe section is equipped on its upper side with a latch plate 52 having a slot 53 to engage the hook 50. A sloping nose 54 on the hook causes the hook to be raised by an end flange 55 when the two pipe ends are brought together, telescoping movement of the pipe ends allowing the hook to drop into slot 53 for automatic locking. Seal ring 47 prevents leakage in the joint. The female connector is preferably incorporated in a tubular fitting 56 which is fixedly secured in the pipe end as shown.

The intermediate sprinkler 17a in FIG. 4 is mounted in a similar coupler fitting 57 so that the pipe itself does not have to be drilled and tapped to receive the sprinkler riser. Trailing end sprinkler 17b is mounted in a coupler fitting 60 having a hook 50 on one end and a drain valve dead end plug 61 in its opposite end. A skid plate 62 protects this plug. Nipple 42 in FIG. 2 is equipped with two of the hooks 50 on its upper and lower sides.

One end of wheel line 10 is closed by a plug and the other end is connected by a supply conduit 69 to a valve outlet 70 in a supply pipe 71 along one side of the field as shown in FIG. 1.

After an area has been watered by the sprinklers 17 on draglines 15, the water supply conduit 69 is disconnected from outlet 70 and the drain valves in plugs 61 are opened to drain the system so that the great weight of water in the wheel line and draglines does not have to be moved. Then the power mover 20 is operated in the direction of arrow 81 to move the draglines to a new area to be watered and supply conduit 69 is connected with a different valve outlet 70 in supply pipe 71.

After watering the last area at the end of the field, the hooks 50 on couplers 13 (FIG. 2) are disengaged and the leading ends of draglines 15 are dropped on the ground. Coupler fittings 60 and sprinklers 17b are removed from the trailing ends of the draglines and connected to their leading ends. Then the wheel line is moved by power mover 20 in the direction of arrow 82 until it reaches the trailing ends of the draglines. Hooks 50 on couplers 15 are now engaged with the trailing ends. Operation of power mover 20 in the direction of arrow 82 pulls the draglines in reverse direction. For reverse travel coupler 13 is rotated 180° so that the bottom hook 50 in FIG. 2 becomes the top hook.

Thus, the draglines may be pulled the length of the field in first one direction then the other to water the entire field with a minimum of manual effort. Once the draglines have initially been placed in position, they are moved thereafter solely by wheel line 10 and power mover 20 and do not have to be turned around manually. Pulling the draglines by their opposite ends permits the use of pipe for the draglines, which is more resistant to abrasion and stronger in tension, permitting longer draglines than the rubber hose draglines heretofore used.

Having now described our invention and in what manner the same may be used, what we claim as new and desire to protect by Letters Patent is:

1. The method of irrigating a field with dragline sprinkler pipes on a wheel line comprising rolling said wheel line in one direction to pull said draglines in said one direction, disconnecting the leading ends of said draglines from said wheel line, rolling said wheel line in reverse direction to position said wheel line at the trailing ends of said draglines, connecting said trailing ends of said draglines to said wheel line, and then rolling said wheel line farther in said reverse direction to pull said draglines in reverse direction.

2. An irrigation system comprising a tubular wheel line supported at intervals on wheels fixedly mounted on said wheel line, a reversible power mover arranged to rotate said wheel line for driving said wheels, tubular draglines equipped with sprinklers, dragline couplers rotatably mounted at intervals on said wheel line, and quick detachable connectors on opposite ends of said draglines for connection with said couplers so that said wheel line may be connected to opposite ends of said draglines for pulling them in opposite directions, said power mover rotating said wheel line in one direction for pulling said draglines by their leading ends when said leading ends are connected to said wheel line, said power mover rotating said wheel line in the opposite direction for moving the wheel line to the trailing ends of the draglines when said leading ends have been disconnected from the wheel line, and said power mover rotating the wheel line farther in said opposite direction for pulling the draglines in reverse direction by said trailing ends after said trailing ends have been connected to the wheel line.

3. A system as defined in claim 2, said draglines being composed of pipe.

4. A system as defined in claim 2, said wheel line comprising a plurality of pipe sections with flanged ends, each of said dragline couplers comprising a tubular member with flanged ends connected to said flanged ends of two of said pipe sections, and a rotatable sleeve on said tubular member having means for connection with said quick detachable connectors on said draglines.

5. In an irrigation system having a wheel line and draglines, a dragline coupler for connecting said draglines to said wheel line, said coupler comprising a tubular member having an integral bolting flange on one end thereof, a bolting flange detachably mounted on the opposite end of said tubular member, a collar on said tubular member between said flanges, a sleeve rotatably mounted on said tubular member between said collar and said integral end flange, said sleeve having a central portion of larger diameter than said tubular member forming an annular chamber around said tubular member, said tubular member having openings into said chamber, a nipple on said sleeve communicating with said chamber, a pair of spaced neck portions on each end of said sleeve forming a seal chamber therebetween, and seal rings in said seal chambers.

6. In a system as defined in claim 5, a threaded connection securing said detachable bolting flange to said tubular member, and screws in said tubular member securing said collar and engaging said detachable bolting flange to prevent rotation of said threaded connection.

7. In a system as defined in claim 5, a pair of hooks pivotally mounted on opposite sides of said nipple for quick detachable connection with a dragline.

References Cited

UNITED STATES PATENTS

| | | | |
|---|---|---|---|
| 2,796,292 | 6/1957 | Maggart | 239—213 |
| 2,990,121 | 6/1961 | Fischer | 239—213 |
| 3,163,361 | 12/1964 | Stout | 239—212 |

SAMUEL F. COLEMAN, Primary Examiner

H. S. LANE, Assistant Examiner